June 6, 1933.  W. C. ANTHONY  1,912,816
ELEVATING SHOVEL
Filed May 25, 1932   2 Sheets-Sheet 2
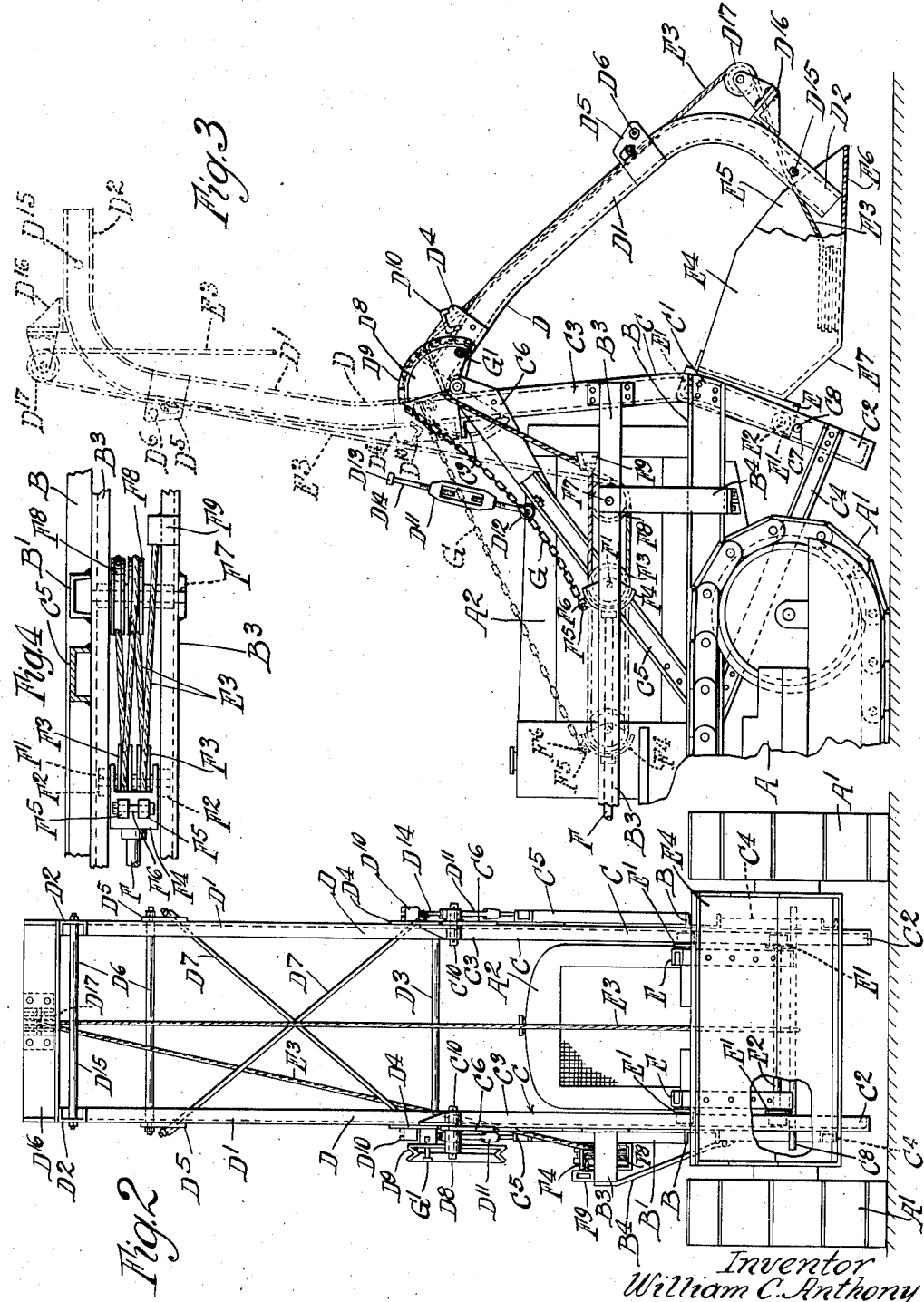
Inventor
William C. Anthony
by Parker & Carter,
Attorneys.

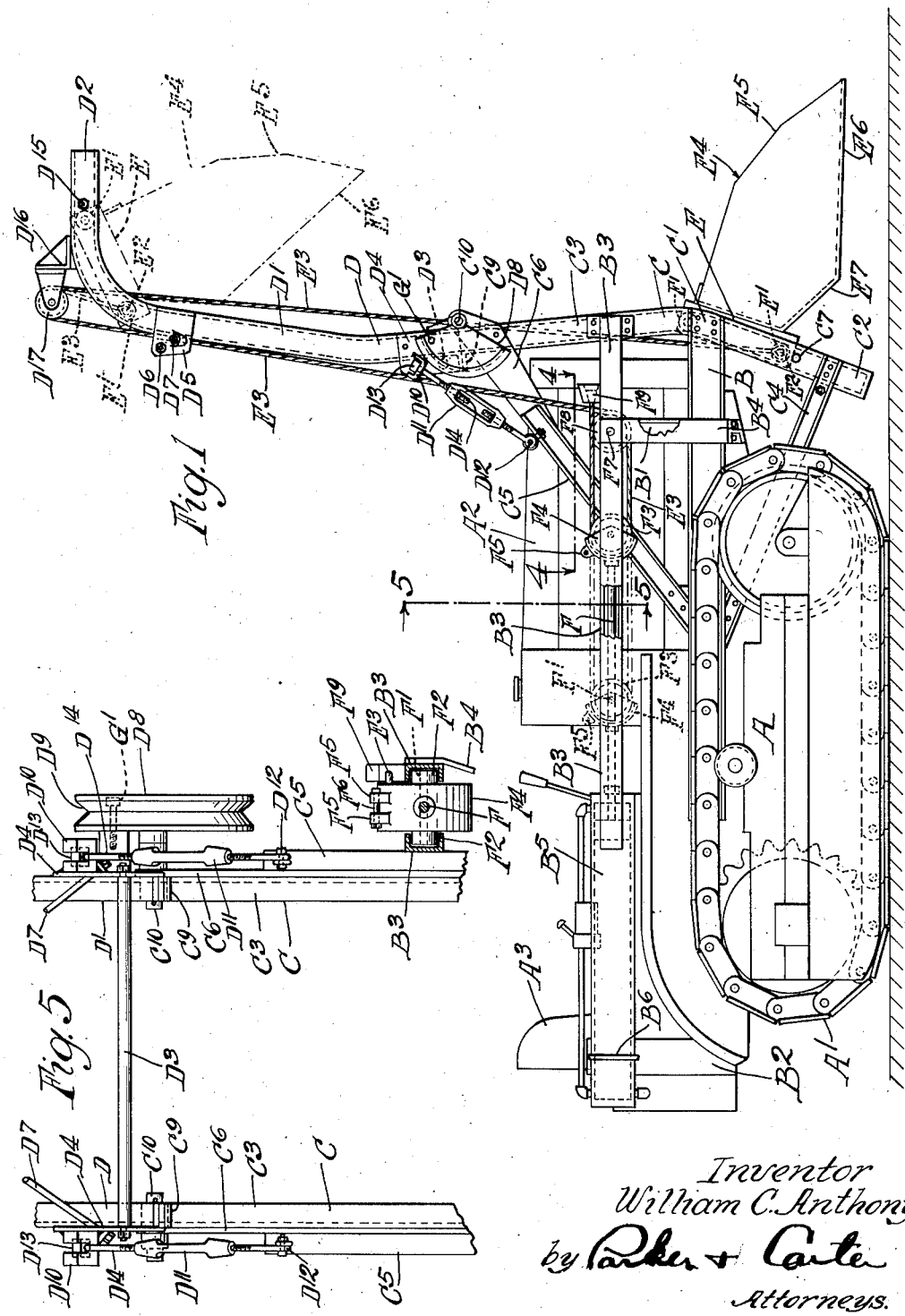

Patented June 6, 1933

1,912,816

UNITED STATES PATENT OFFICE

WILLIAM C. ANTHONY, OF STREATOR, ILLINOIS, ASSIGNOR, BY MESNE ASSIGNMENTS, TO ANTHONY DEVELOPMENT COMPANY, OF STREATOR, ILLINOIS, A SYNDICATE

ELEVATING SHOVEL

Application filed May 25, 1932. Serial No. 613,421.

This invention relates to a shovel of the type which may be mounted on a vehicle and may be used for raising material and for dumping it, and may also be used as a digging shovel. For the latter purpose it may be mounted on an automotive vehicle and when moved to a low enough position if the vehicle is driven ahead, the shovel will dig up material with which it comes in contact and the shovel may then be raised and dumped. It may thus be used as an excavating device, a transporting device or a loader, since with the bucket full, the vehicle may be moved from place to place, and the full bucket dumped at any suitable location.

One object of the invention is to provide in connection with a shovel of the type indicated, a mechanism which permits folding. Another object is to provide in connection with a shovel adapted to be moved along a track, a track which may be folded or lowered to reduce the over-all height of the shovel. Another object is to provide in such a shovel, having a folded track, means for moving the bucket and for utilizing this same moving means to raise and lower the track from its folded to its extended position and vice versa.

Other objects will appear from time to time in the specification and claims.

The invention is illustrated more or less diagrammatically in the accompanying drawings, wherein:—

Figure 1 is a side elevation with parts broken away and parts in section;

Figure 2 is a front elevation with parts broken away;

Figure 3 is a fragmentary side elevation showing the track in the folded or broken position.

Figure 4 is a generally longitudinal horizontal section taken at line 4—4 of Figure 1, on an enlarged scale;

Figure 5 is a transverse enlarged detail taken at line 5—5 of Figure 1, showing parts in elevation and parts in section.

Like parts are designated by like characters throughout the specification and drawings.

A indicates generally the running gear of an automotive tractor which may be provided with a creeper chain $A^1$. An engine of any suitable type is indicated as at $A^2$. $A^3$ is a driver's seat. The details of these parts and of the vehicle itself form no particular part of the present invention, as the apparatus may be applied to almost any suitable vehicle, whether it be automotive or not.

A shovel assembly is preferably mounted on the sub-frame which may include generally longitudinal members B, which are themselves attached to or mounted upon the vehicle. At one side, the right side as shown in Figures 1 and 2, one member B carries a vertical member $B^1$ toward the forward end of the frame, and a second member $B^2$ toward the rear end of the frame. A cross head guide and hydraulic cylinder assembly is supported between uprights $B^1$, $B^2$. This assembly comprises a pair of channel guides or tracks $B^3$ $B^3$ fastened one to the vertical member $B^1$ and the other to an inclined brace $B^4$ which is secured at its lower end to one of the frame members B. Adjacent their rear ends the channels $B^3$ are secured to a hydraulic cylinder $B^5$ which is supported on the rear vertical frame member $B^2$ and may be attached thereto by a U-bolt $B^6$. The details of the sub-frame construction might be almost infinitely varied so long as sufficient supporting means are provided for carrying the shovel mechanism, the operating mechanism and the track and associated parts.

Mounted generally at the forward end of the sub-frame members B and at the forward end of the vehicle is a pair of track portions C, C. These are preferably channel shaped as shown and are attached to the frame members B as at $C^1$. They may be shaped to provide rearwardly bent lower end portions $C^2$ and rearwardly bent upper portions $C^3$ so that the track preferably bends rearwardly both above and below an intermediate point, which in this case is approximately the point of attachment to the frame members B. $C^4$ $C^4$ are lower bracing members attached at one end to the sub-frame and at the other end to the track section $C^2$. $C^5$ $C^5$ are bracing members each attached at its lower end to the sub-frame and at its upper end to an attaching or gusset plate $C^6$, which is itself fastened to the track portions $C^3$, and thus the members $C^5$ and $C^6$ serve to brace and stiffen the track portions $C^3$. The lower track portions $C^2$ $C^2$ are perforated as at $C^7$ or otherwise provided with means to receive a rod $C^8$, when the bucket is in the lowered and inactive position, as illustrated in Figures 2 and 3. In Figure 1 the rod is not in place. Adjacent their upper ends the track sections $C^3$ are provided with stops or flanges $C^9$ extending rearwardly and preferably adjacent their forward edges and supported in the plates $C^6$ they are provided with hinge pins or trunnions $C^{10}$.

Supported for rotation upon the hinge pins $C^{10}$ is an upper track section which includes a pair of tracks D, D, which tracks are preferably bent generally forward as at $D^1$ and adjacent their upper ends curved sharply forward to provide a more or less horizontal portion $D^2$. Adjacent their lower ends the tracks D are fastened together by a tie rod $D^3$ which is mounted in attaching plates $D^4$ $D^4$. Intermediate the ends of the track sections D are attaching plates $D^5$ $D^5$ in which a tie rod $D^6$ is mounted. Diagonal bracing tie rods $D^7$ $D^7$ are secured at their lower ends in the plates $D^4$ and at their upper ends in the plates $D^5$. Fastened to one of the attaching plates $D^4$ is a quadrant $D^8$ which is preferably provided with a grooved periphery as at $D^9$. A slotted attaching lug $D^{10}$ is also preferably mounted on each of the plates $D^4$. The upper track section is mounted to swing about the pins $C^{10}$. When the vehicle as a whole is to be stored or moved long distances, the upper track is moved into the position shown in Figure 3. For normal operation it is moved into the position shown in Figures 1 and 2, in which the entire track structure forms a continuous track from top to bottom along which the bucket may run. Turn buckle assemblies $D^{11}$ are preferably pivotally mounted as at $D^{12}$ on each of the bracing members $C^5$ and include members provided with heads $D^{13}$ and shanks $D^{14}$, arranged to fit into the slotted lugs $D^{10}$ as shown generally in Figures 1 and 2, and in detail in Figure 5, to hold the track structure in the operative position. Adjacent its upper end the upper track section may carry a stop member $D^{15}$ which in the form shown is a rod extending across between the tracks and serves to limit the extreme upward and outward movement of the bucket. A cross member $D^{16}$ situated adjacent the upper end of the track, carries in suitable supports a sheave $D^{17}$ over which the hoisting cable, which will be described below, is arranged to run.

E is a dolly provided with pairs of rollers $E^1$ $E^1$ arranged to run in the tracks. A shaft or shafts $E^2$ $E^2$ may extend laterally across between pairs of rollers as indicated particularly in Figure 2, and to this shaft a hoisting cable $E^3$ is fastened. The cable could, of course, be fastened to the dolly in any other suitable manner. A bucket $E^4$ is mounted on the dolly as shown, the bucket being provided with an open forward end $E^5$ and is made up of side, bottom and rear members. Its bottom may be formed in any suitable way but as shown it is arranged with a generally flat portion $E^6$ and a relatively inclined portion $E^7$.

The hoisting mechanism includes the hydraulic cylinder $B^5$ and suitable means for supplying fluid to the cylinder to move a piston within it. These parts are not shown in detail as their details form no particular part of the present invention. A piston is mounted in the cylinder and is provided with a piston rod F which extends outside of the cylinder and carries a cross head assembly, including a shaft $F^1$, a pair of rollers $F^2$ $F^2$ which travel in the guide tracks $B^3$. Mounted on the shaft $F^1$ is one or more sheaves $F^3$ and partially enclosing the sheaves and shaft is a housing member $F^4$ which is fastened to the piston rod F and which carries, preferably at its top, a pair of perforated ears $F^5$ $F^5$ arranged to receive and support a bolt $F^6$. Mounted in suitable bearings in a fixed location in the track $B^3$ is a shaft $F^7$ upon which are mounted one or more sheaves $F^8$ $F^8$. $F^9$ is a perforated cable receiving member within which the ends of the hoisting cable $E^3$ is received or "dead ended", as shown in Figures 1, 3 and 4.

G is a chain which may be fastened at one end upon the bolt $F^6$ as shown in Figure 3. At its other end it may be fastened upon a bolt or pin $G^1$ carried adjacent the forward portion of the quadrant $D^8$. The chain is used only for raising or lowering the upper track section to and from the operative position.

It will be realized that whereas I have herewith shown and described a practical operative device, nevertheless many changes might be made in the size, shape, number and disposition of parts without departing from the spirit of the invention and I wish, therefore, that my showing be taken as in a sense diagrammatic.

The use and operation of the invention are as follows:

For normal operation the parts are assembled as shown in Figure 1. In that position the hoisting cable $E^3$ is "dead ended" as at $F^9$, passes about the sheaves $F^3$ on the cross head and about the sheaves $F^8$ on the shaft $F^7$ and thence upward about the sheave $D^{17}$ to its point of attachment on the dolly or bucket. In this position, with the cross head in the forward position as shown in full lines in Figure 1, the bucket is lowered and is in a position to receive a load which may be raised for dumping, if the piston is operated so as to move the cross head from the full line position of Figure 1 to the dotted line position of that figure. With this movement of the piston the bucket is raised to the dotted line position of Figure 1 and will discharge its contents. The bucket may thus be raised and lowered as desired by movement of the piston within the cylinder. Where the device is to be used as an excavating shovel the bucket is lowered so that it rests upon the surface of the ground. This is possible when the stop bar $C^8$ is removed from the perforations $C^7$ in the lower track sections $C^2$. Thus when digging is to be done, the bucket is lowered below the full line position of Figure 1 and the vehicle is moved or forced against the point of digging and a load is backed up by the forward movement of the bucket in response to the pushing of the vehicle. When the bucket is filled in this operation it may be directly raised or the vehicle may be backed off and the bucket then raised.

No matter how the bucket is filled, it may be raised partially along the track, the vehicle may then be driven to the point of dumping and the bucket fully raised and the load discharged. The shovel is thus available as a conveying device.

When the device is to be moved into the collapsed or folded position as shown in Figure 3 in full lines, the stop bar $C^8$ is inserted in the perforation $C^7$, the hoisting cable $E^3$ is preferably disconnected from the dolly, the chain G is fastened to the cross head and to the quadrant, the turn buckles $D^{11}$ are disconnected from the lugs $D^{10}$ and the cross head which has first been moved into the dotted line position of Figure 3 is permitted to move to the full line position of that figure, thus lowering the upper or hinged track section to the full line position of Figure 3. When it has reached this position, the upper or free end of the upper track section rests in the bucket and since the bucket is held and supported by the tracks and the stop bar $C^8$, neither the cable nor the chain is under tension. The entire load of all of the parts is thus carried by the lower track section and the sub-frame. The shovel in the position shown in the dotted lines in Figure 3 is conveniently arranged for transport over long distances, or for storage, or shipping, for example, on a railroad car or truck or any other manner.

When the shovel is again to be put into use, the chain G, if it has been removed, is replaced into the position shown in Figure 3. The cross head is then moved from the full line position to the dotted line position of that figure and the upper track section is swung by the chain from the full line position to the dotted line position. The turn buckles $D^{11}$ are again inserted in the lugs $D^{10}$ and locked into position and the track assembly as a whole is then firmly held in the position shown in dotted lines in Figure 3, and in full lines in Figure 1. The chain G is removed, the hoisting cable $E^3$, if it has been detached from the dolly, is again attached, and the parts are all thus restored to the condition shown in Figure 1 and the shovel is ready for normal use.

Although I have shown and described the means and method of moving the track from the operative to the broken or folded position, as including the main hydraulic cylinder, this is not essential. For purposes of convenience it is frequently advisable to use the main bucket operating hydraulic cylinder to raise and lower the track. However, an auxiliary cylinder might be provided for this purpose so that the bucket operating cylinder might not be used and in fact a complete independent hydraulic or other means might be provided for raising and lowering the track. In other words, the track raising means might be, as in the present case, identical with the bucket raising means or it might be partially or wholly independent of it.

I claim:

1. In combination in a shovel mechanism, a track, a bucket to run along the track, means for moving it, the track formed in relatively movable portions, the track sections normally held against relative movement, the bucket moving means adapted to move the movable track section, means for supporting the bucket in position, the bucket adapted when so supported to receive and support the free end of the movable track section.

2. In combination in a shovel mechanism, a track, a bucket to run along the track, means for moving it, the track formed in relatively movable portions, the track sections normally held against relative movement, the bucket moving means adapted to control movement of the movable track section, means for supporting the bucket in position, the bucket adapted when so supported to receive and support the free end of the movable track section.

3. In combination in a shovel mechanism, a track, a bucket to run along the track, means for moving it, the track formed in relatively movable portions, the track sections normally held against relative movement, the bucket moving means adapted to move and to control movement of the movable track section, means for supporting the bucket in position, the bucket adapted when so supported to receive and support the free end of the movable track section.

4. In combination in a shovel mechanism, a track, a bucket to run along the track, means for moving it, the track formed in two relatively movable portions, the two track sections normally held against relative movement, the bucket moving means adapted to move the movable track section, means for supporting the bucket in position, the bucket adapted when so supported to receive and support the free end of the movable track section.

5. In combination in a shovel mechanism, a track, a bucket to run along the track, means for moving it, the track formed in two relatively movable portions, a support for one, the two track sections normally held against relative movement, the bucket moving means adapted to move and to control movement of the movable track section, means for supporting the bucket in position, the bucket adapted when so supported to receive and support the free end of the movable track section.

6. In combination in a shovel, a track assembly, a bucket mounted for movement thereon and means for moving it, a portion of the track movable with respect to the rest of the track assembly and adapted to be folded, means for supporting the bucket in position on the track, the bucket when so supported in position adapted to receive and to act as a support for the free end of the foldable track section.

7. In combination in a shovel, a track assembly, a bucket mounted for movement thereon and means for moving it, a portion of the track movable with respect to the rest of the track assembly and adapted to be folded, means for supporting the bucket in position on the track, the bucket when so supported in position adapted to receive and to act as a support for the free end of the foldable track section, the bucket moving means adapted to be connected to the folding track section.

8. In combination in a shovel, a track assembly, a bucket mounted for movement thereon and means for moving it, a portion of the track movable with respect to the rest of the track assembly and adapted to be folded, means for supporting the bucket in position on the track, the bucket when so supported in position adapted to receive and to act as a support for the free end of the foldable track section, and removable means for locking the track sections against relative movement.

9. In combination in a shovel, a track assembly, a bucket mounted for movement thereon and means for moving it, a portion of the track movable with respect to the rest of the track assembly and adapted to be folded towards it, means for supporting the bucket in position on the track, the bucket when so supported in position adapted to receive and to act as a support for the free end of the foldable track section, the bucket moving means adapted to be connected to the folding track section, and when so connected to raise it, and removable means for locking the track sections against relative movement.

10. In combination in a shovel mechanism, a track, a bucket to run along the track, means for moving it, the track formed in relatively movable portions, a support for one, the track sections normally held against relative movement, means for supporting the bucket in position, the bucket adapted when so supported to receive and support the free end of the movable track section.

11. In combination in a shovel, a multiple part track comprising a plurality of track sections mounted together for relative movement, a supporting structure, a bucket movably mounted on the track, power means for moving the bucket therealong, a driving connection between the bucket and the power means, and an additional driving connection between the power means and one of the track sections, whereby the power means may be actuated to give one track section relative motion with respect to another track section, and a curved member mounted on the movable track section, adapted to receive and guide the connection between the movable track section and the power source.

12. In combination in a shovel, a multiple part track comprising a plurality of track sections mounted together for relative movement, a supporting structure, a bucket movably mounted on the track, power means for moving the bucket therealong, a flexible driving connection between the bucket and the power means, and an additional flexible driving connection between the power means and one of the track sections, whereby the power means may be actuated to give one track section relative motion with respect to another track section, and a curved member mounted on the movable track section, adapted to receive and guide the connection between the movable track section and the power source.

13. In combination in a shovel, a multiple part track comprising a plurality of track sections mounted together for relative movement, a supporting structure, a bucket movably mounted on the track, power means for moving the bucket therealong, a driving connection between the bucket and the power means, and an additional driving connection between the power means and one of the track sections, whereby the power means may be actuated to give one track section relative motion with respect to another track section, said power means comprising a hydraulic cylinder and piston, and a curved member mounted on the movable track section, adapted to receive and guide the connection between the movable track section and the power source.

14. In combination in a shovel, a multiple part track comprising a plurality of track sections mounted together for relative movement, a supporting structure, a bucket movably mounted on the track, power means for moving the bucket therealong, a flexible driving connection between the bucket and the power means, and an additional flexible driving connection between the power means and one of the track sections, whereby the power means may be actuated to give one track section relative motion with respect to another track section, said power means comprising a hydraulic cylinder and piston, and a curved member mounted on the movable track section, adapted to receive and guide the connection between the movable track section and the power source.

15. In combination in a shovel, a multiple part track comprising a plurality of track sections mounted together for relative movement, a supporting structure upon which one of the track sections is mounted, a bucket movably mounted on the track, power means for moving the bucket therealong, a flexible driving connection between the bucket and the power means, and an additional flexible driving connection between the power means and one of the track sections, whereby the power means may be actuated to give one track section relative motion with respect to another track section, said power means comprising a hydraulic cylinder and piston, and a curved member mounted on the movable track section, adapted to receive and guide the connection between the movable track section and the power source.

16. In combination in a shovel, a multiple part track comprising a plurality of relatively movable track sections, a power source, a connecting member between said power source and one of said track sections, for moving the latter, and a curved member on said movable section, said connection being positioned about said curved member.

17. In combination in a shovel, a multiple part track comprising a plurality of relatively movable track sections, a power source, a connecting member between said power source and one of said track sections, for moving the latter, and a curved member on said movable section, said connection being positioned about said curved member, said power source comprising a hydraulic cylinder and piston, one being movably mounted and the other fixed, and means on one for attaching the connection between the power source and the movable track section.

Signed at Streator, county of La Salle and State of Illinois, this 20th day of May, 1932.

WILLIAM C. ANTHONY.